No. 736,864. PATENTED AUG. 18, 1903.
O. C. MOORE.
AUTOMATIC CAR COUPLING.
APPLICATION FILED NOV. 17, 1902.
NO MODEL. 3 SHEETS—SHEET 1.
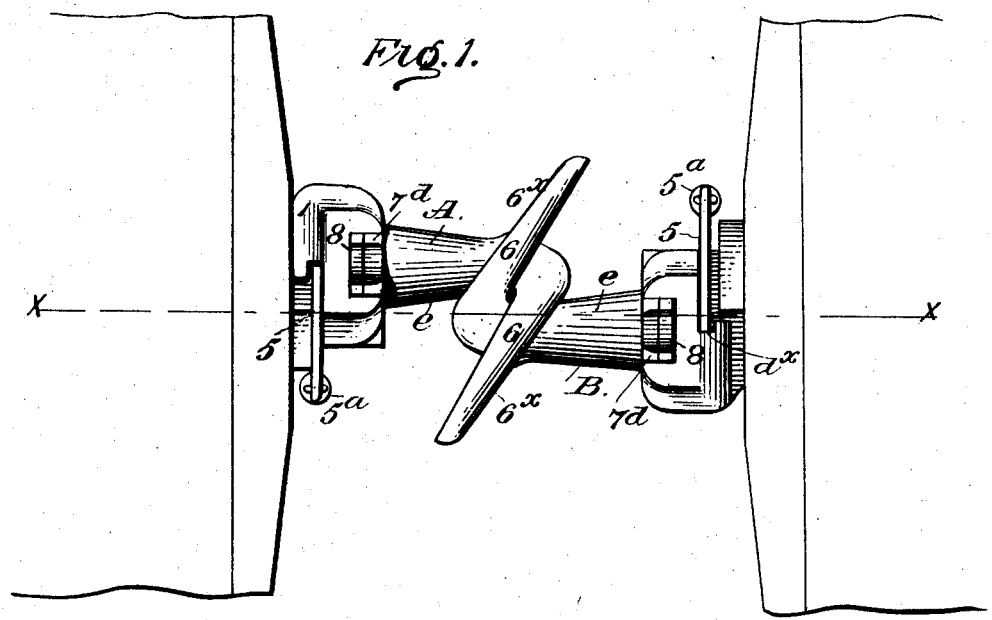
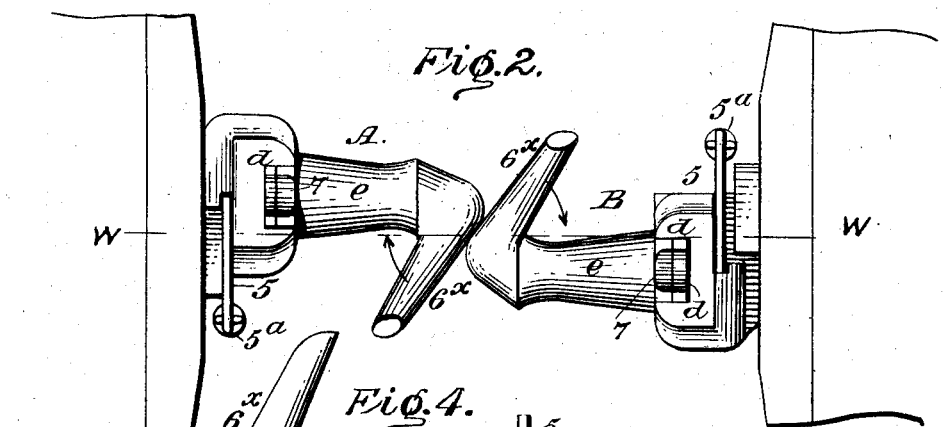
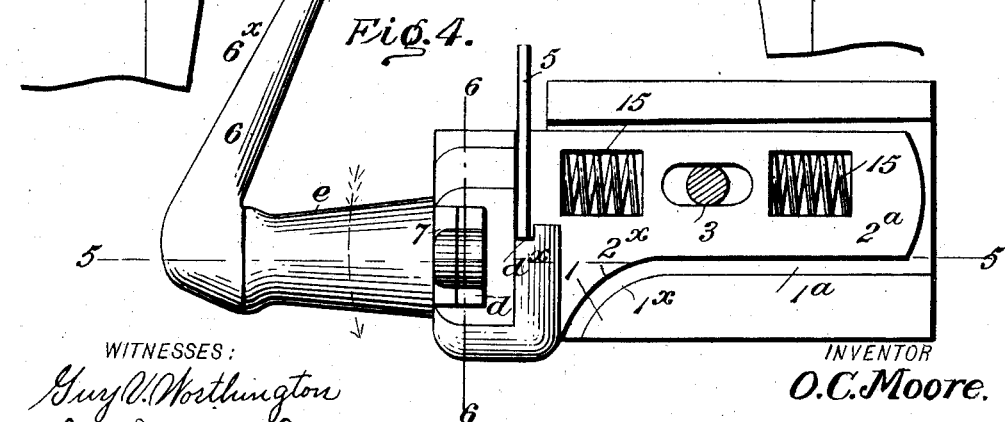
WITNESSES:
Guy V. Worthington
John E. Burch
INVENTOR
O. C. Moore.
BY
Fred G. Dieterich & Co.
ATTORNEYS.

No. 736,864. PATENTED AUG. 18, 1903.
O. C. MOORE.
AUTOMATIC CAR COUPLING.
APPLICATION FILED NOV. 17, 1902.
NO MODEL. 3 SHEETS—SHEET 2.
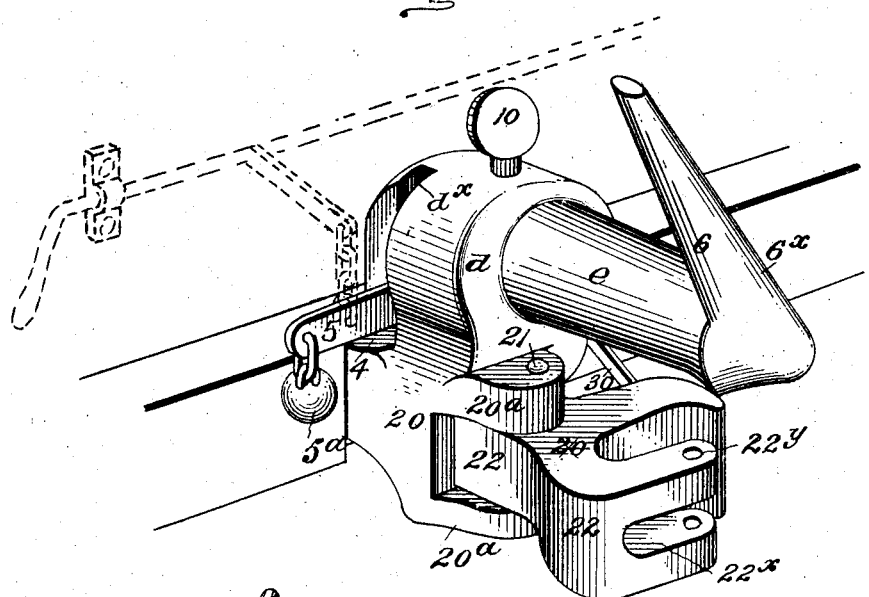
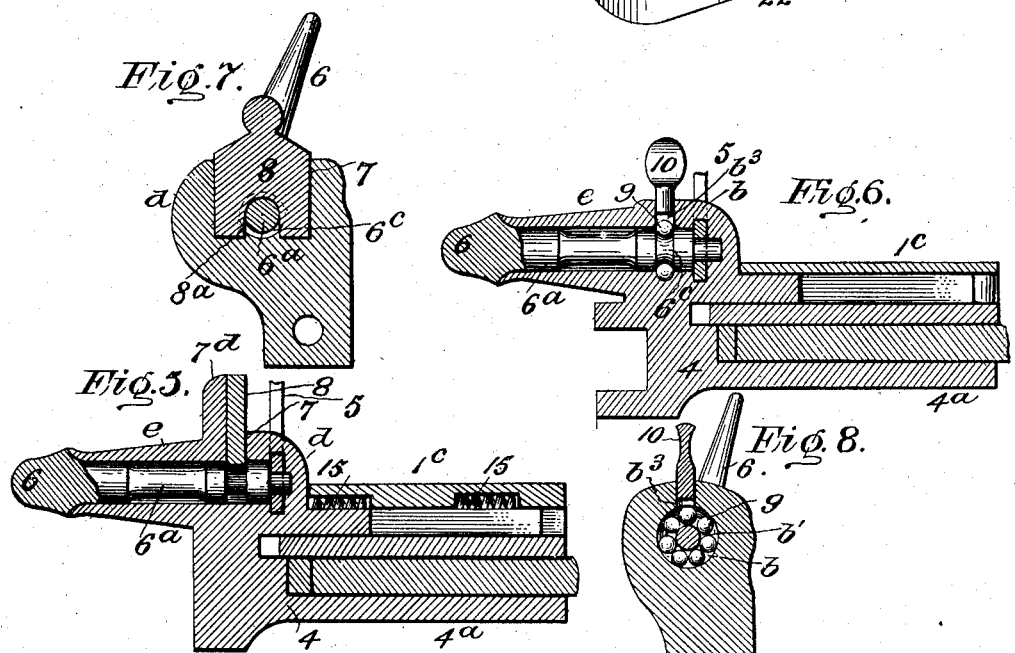
WITNESSES:
Guy V. Worthington
John E. Burch
INVENTOR
O. C. Moore
BY
Fred G. Dieterich
ATTORNEYS No. 736,864. PATENTED AUG. 18, 1903.
O. C. MOORE.
AUTOMATIC CAR COUPLING.
APPLICATION FILED NOV. 17, 1902.
NO MODEL. 3 SHEETS—SHEET 3.
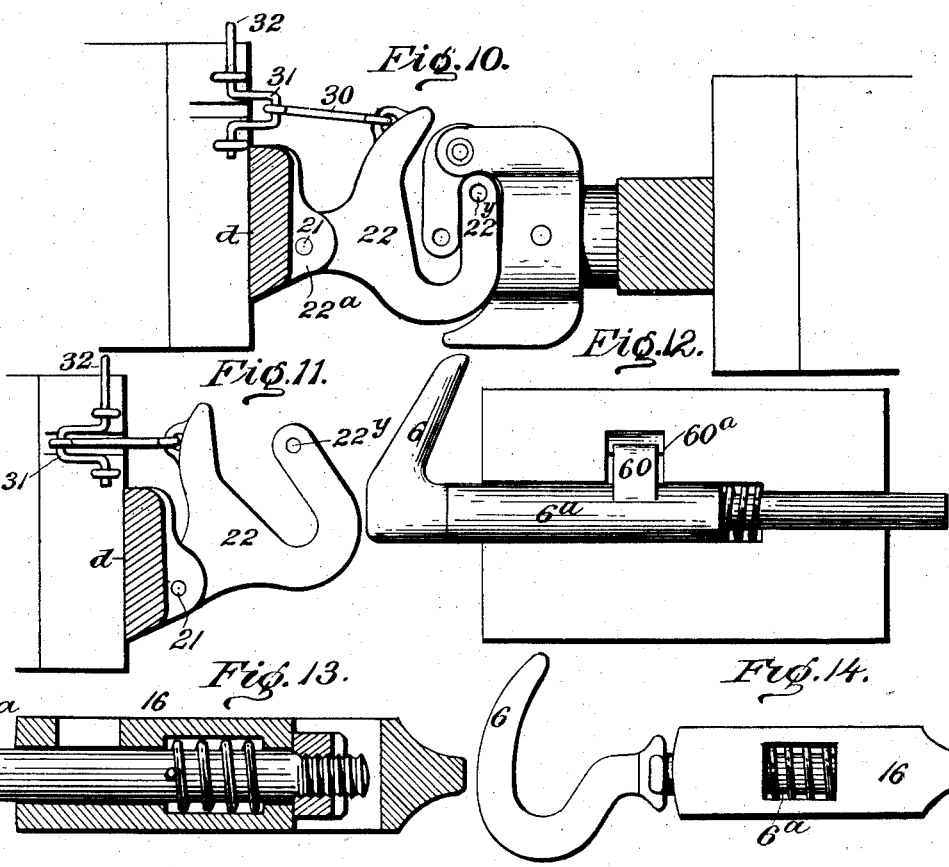

No. 736,864. Patented August 18, 1903.

UNITED STATES PATENT OFFICE.

OTHO C. MOORE, OF NORFOLK, VIRGINIA, ASSIGNOR OF ONE-HALF TO JAMES BARKLEY, OF NORFOLK, VIRGINIA.

AUTOMATIC CAR-COUPLING.

SPECIFICATION forming part of Letters Patent No. 736,864, dated August 18, 1903.

Application filed November 17, 1902. Serial No. 131,737. (No model.)

*To all whom it may concern:*

Be it known that I, OTHO C. MOORE, residing at Norfolk, in the county of Norfolk and State of Virginia, have invented a new and Improved Automatic Car-Coupling, of which the following is a specification.

My invention, which generically is in the nature of an improved car-coupling mechanism in which is included two opposing coupling members arranged to automatically interlock by impact force as the two opposing drawheads come togther, is more particularly designed to provide an improved automatic coupling having coupling members which operate under a rotary action—that is, in which the interlocking jaws form a part of horizontally-disposed rockable shafts from which the jaws or locking-hooks project laterally and which are of a shape whereby as the two hook members engage with each other they act on each other to automatically effect an interlocked position, the said hooked portions and their shafts being also arranged to be conveniently uncoupled from the sides or top of the car.

Primarily my invention seeks to provide an improved automatic car-coupling mechanism of the character stated of a few parts combined to have great strength and durability and capable of being manufactured at an expense not more than the present-used type of knuckle-joint-coupling mechanisms.

My invention comprehends a draw-head mounted on the car-body provided with means for sustaining it firmly on the car-body and admit of the required longitudinal buffer motion and the lateral swing of the couplinghead necessary to compensate for the lateral movement required for coupling-heads of the kind stated. The said draw-head also includes an inwardly-projecting sleeve and a peculiar construction of rocking member and shaft rockably mounted within the sleeve and for engaging with the locking member and means joined to the said shaft for automatically locking said shaft to the predetermined position in one construction.

In its more complete nature my invention seeks to provide an improved construction of coupling mechanism in which special provision is made whereby opposing coupling members of like form will interlock as they come together and whereby my improved type of draw-bar and coupling-head can also be readily coupled up with a knuckle-joint coupler and by means of a link-and-pin connection coupled with any other type of coupling and in which the several parts are especially designed for instantaneous action, in which allowance is made for considerable vertical and lateral or swaying motion of the car without in any appreciable degree lessening the coupling action and in which the draw-heads are mounted and the coupling-hooks of such relative shape to allow a car to be lifted bodily upward, dropped downward, or thrust sidewise out of train alinement and connection without injury to the coupling parts or dragging other cars with it.

Furthermore, my invention embodies, in combination with the rotary coupling device, a supplemental coupling member for interlocking with a knuckle or Janney type coupling when an opposing car is equipped with said type of coupling, and the said type of coupling member is suitably mounted to cooperate with a detent mechanism, whereby when said supplementary coupling member is not required for use it can be swung out of the way and from interfering with the main rotary coupling mechanism.

In its more subordinate features my invention consists in certain novel details of construction and peculiar combination of parts, all of which will hereinafter be fully explained, and specifically pointed out in the appended claims, reference being had to the accompanying drawings, in which—

Figure 1 is a plan view of two couplingheads constructed in accordance with my invention coupled together. Fig. 2 is a diagrammatic plan view showing the relative position of the coupling-hooks as they approach each other in a coupling action. Fig. 3 is a perspective view of a complete construction of my coupling mechanism, showing the preferred construction. Fig. 4 is a plan view of one of the coupling mechanisms, the top or cap plate of the housing in which the upper shaft member is held being removed. Fig. 5 is a longitudinal section of the same, taken on the line 5 5 of Fig. 4. Fig. 6 is a longitudinal section of the sleeve and the shaft of the hook member and a modified means for holding the shaft within said sleeve. Fig. 7 is a transverse section on the line 7 7 of Fig. 5. Fig. 8 is a similar view on the line 8 8 of Fig. 6. Fig. 9 is a detail perspective view of one of the rotatable hooks and its shaft. Fig. 10 is a plan view illustrating the manner in which the knuckle coupling member interlocks with a Janney or other knuckle coupling-head. Fig. 11 illustrates the said member moved back out of an operative position. Fig. 12 is a view illustrating a modified arrangement of the rotary coupling members. Figs. 13 and 14 are views of another modification thereof hereinafter explained.

In carrying out my invention in its preferred and complete form the entire draw bar and head mechanism for a car includes, in addition to the rotary coupling device, a supplementary coupling member in the nature of a pivoted knuckle which is provided in the usual horizontal slot and the vertical aperture bisected by the slot for the use of the common link-and-pin devices when necessary.

Referring now to the structural arrangement of my improved coupling mechanism, A and B designate the opposing draw-heads, and as both draw-heads are of like construction a detail description of one will suffice for both.

The coupling mechanism comprises a body portion 1, horizontally disposed in relation to the car-body and mounted on the bumper-carrying timbers of the said car-body in any approved manner, and the said car-body is also formed with a longitudinal channel $1^a$ in its upper face to accommodate the shank or draw-bar $2^a$ of the draw-head, which channel is sufficiently wide to permit of lateral play of the draw-head in the direction of the arrow, (see Fig. 4,) and the front end $1^x$ of the channel-wall is suitably cut out to accommodate a correspondingly-shaped edge $2^x$ of the draw-bar or shank 2, the longitudinal or buffer movement of which is limited by a stop-bolt 3, that passes through the channeled portion of the body 1, a cap-plate $1^c$, and the car-timbers, as shown, and in the complete form of my invention, as shown in Fig. 3, it also passes through a shank $4^a$ of the supplementary coupling-head 4, hereinafter fully described.

By referring more particularly to Figs. 5 and 6 it will be noticed the body 1 has a vertical extension $d$, which is cast integrally with the body, and with an outwardly-projecting externally-tapering sleeve $e$, which extends a predetermined distance and forms a bearing for its coöperating member and means for aiding the proper interlocking of the coupling-hooks, as will more fully appear. It will be noticed in Fig. 2 the longitudinal axial line of the sleeve $e$ is sufficiently to one side of the center or line of draft (designated by X X) to allow for the proper impact and shifting action of the opposing coupling hooks or members, said opposing members being so arranged relatively to each other that when interlocked their point of grip will be on the central or draft line X X, as will be clearly understood from the drawings.

The vertical portion $d$ of the draw-head is also provided with a recess $d'$ at one side, in which plays a crank member 5, joined with the rotary coupling member presently described, which acts as a lever and is weighted, as at $5^a$, and fixedly joined with the shaft $6^a$ of the coupling-head in such manner that the hook portion of the said coupling member normally gravitates to an interlocking or coupling position. The coupling member comprises a shaft $6^a$, whose outer end merges with an integral coupling-hook 6, that projects laterally and rearwardly, and its outer or impacting edge $6^x$ is suitably beveled and arranged, whereby in contacting with an opposing hook of like shape the two hook members will freely and automatically turn in opposite directions to a point slightly beyond a vertical position and in so doing rock their respective shaft portions mounted in the bearing-sleeves and correspondingly elevate the weighted lever member 5, the upward movement of which is limited by reason of its engaging a stop-shoulder $d^x$ of the transverse recess $d$, as clearly shown in Fig. 3. In the practical construction of the coupling member the hook portions 6 may be made of such length and with any degree of backward pitch as conditions may make desirable. The backward pitch, however, need be but sufficient to provide for the proper overlapping of the two opposing hooks 6 and to prevent said hooks 6 riding out of engagement by reason of the lateral and vertical sway of the cars in motion and the degree that the sleeves of the draw-heads may be thrown apart while rounding curves. The pitch or slope under all conditions is such that the two members 6 have such relative interlocking engagement that the grip of the two members will bring the draft strain as near as possible to the center line of the draw-heads, which line in the coupling draw-heads is in the plane of the adjacent peripheral edges of the two opposing sleeves, as indicated by W W in Fig. 2. The shafts $6^a$ are held within the sleeves from being pulled outward by stop devices, which may be arranged as shown in Figs. 5 and 7, but preferably as shown in Figs. 6 and 8.

In the construction shown in Figs. 5 and 7 the extension $d$ of the draw-head is slotted vertically, as at 7, to receive a stop-plate 8, which has a bifurcated lower end $8^a$ to straddle the shaft $6^a$ and engage with an annular groove $6^c$ in the shaft, as best shown in Fig. 7, and the said stop-plate 8 may be secured to a projection $7^d$ on the draw-head in any approved manner.

In the construction shown in Figs. 6 and 8 the groove $6^c$ is made deep enough to form a part of $b'$ of a ball-race, the other part of which is formed by the adjacent annular channel $b$ in the draw-head, with which communicates a feed-opening $b^3$ for the insertion of the balls 9, said opening in practice being closed by a plug 10, as shown. The ball-bearing stop devices are preferred, as they allow for the shaft rotating with greater ease and smoothness, such form being most desirable for passenger-train service; but for rough usage, such as in freight-hauling, the plate device 8 and the nut and key-pin, (indicated by 11 and 12 in Figs. 12 and 13,) hereinafter again referred to, may be used.

In the practical arrangement of my coupling mechanism means are also provided for tilting lever 5 to turn the shaft $6^a$ to uncouple the hook 6, operable from the sides or top of the car and of any approved or suitable construction.

The coupling-levers 5 by reason of their attachment with the shaft $6^a$ $6^a$ move back and forth under the bumping and pull action of the draw-heads, and hence the uncoupling device, operatable from the seats or top of the car, must be joined with the said levers 5 in a manner to permit of the said reciprocal movement of the levers 5 and relatively to the car-frame. The means for lifting the uncoupling-lever 5 per se form no part of my invention, and a specific description thereof is therefore deemed unnecessary.

The buffer-springs 15 15 for the draw-head may also be arranged in any approved manner to take up the shock in bumping or pulling and may under some conditions be omitted.

In Fig. 12 is illustrated a slightly-modified form of my invention, and in this form the hook and shaft have substantially the shape of the coincident parts shown in Fig. 3; but the shaft has a lateral stop-plug 60, adapted when the hook is in its coupling position to move into a socket $60^a$ in the draw-bar, which acts as a stop to take up the entire pushing or pulling strain.

In Figs. 13 and 14 a further modification of my invention is shown, in which the hook end of the coupling member is substantially U-shaped, an integral part of the shaft mounted in the plate 16, which plate may be an integral part of or made fast to the draw-bar, and the shaft is also provided with a stop nut and pin and buffer-spring devices connected thereto, as shown.

In the complete arrangement of my invention, as shown in Fig. 3, the draw-head is equipped with the supplementary or pendent portion 20, horizontally bifurcated to form ears $20^a$ $20^a$, which are apertured to receive a fulcrum-pin 21, located in the center or draft line, and on which is pivotally mounted the shank $22^a$ of a knuckle coupling-head 22, designed to coact with an opposing Janney or knuckle coupling, as clearly indicated in Fig. 10. The head or gripper 22 when adjusted in the position shown in Figs. 3 and 10 is adapted to engage an opposing knuckle coupler-head when open, and the said member 22 has sufficient radius of movement to allow of being drawn out of the line of interference with a like attachment carried on an opposing coupling-head embodying my improvements. To hold the member 22 to its set or coupling position, suitable detent devices are provided, which may be in the nature of a short-length arm 30, (see Figs. 10 and 11,) pivotally connected at one end to the head-piece 22 and at the other end to the crank member 31 of a rock-shaft 32, which shaft when adjusted to the position shown in Fig. 10 holds the member 30 to its forward or extended position and locks the head-piece 22 to its operative position, and when the said arm 30 is drawn backward by the rear adjustment of the crank 31 the head 22 is moved out of a line of interference with a like head on an opposing car. When the draw-head 22 is connected to a Janney type of opposing coupling, the two heads are uncoupled by simply withdrawing the lock-pin in the Janney type of coupler in any well-known manner. To provide a rigid connection for the head 22, the same has a rearwardly-extending shank that projects under the car-floor timbers, as clearly shown in Fig. 5.

From the foregoing, taken in connection with the accompanying drawings, it is believed the manner of operation and the advantages of my invention will be apparent. It will be observed the several parts are designed for an instantaneous and positive coupling action and are so disposed to permit of the required maximum lateral and vertical motion of the cars. No considerable "slack" in the engagement of the parts is had, and the lost motion usually incident in this type of couplings is cut down, and racking and jerky actions are reduced to a minimum. All of the parts are in themselves and coöperatively constructed, whereby any of the minor parts can be readily replaced, and, furthermore, to permit of coupling with an ordinary link-and-pin connection in case of a serious breakage in the main parts of the coupler the member 22 (which is horizontally slotted, as at $22^x$, and provided with pin-apertures $22^y$) can by the link-and-pin connection couple with an opposing draw-head.

Changes in the details or modifications in the construction shown and described may be readily made to come within the scope of the appended claims.

Having thus described my invention, what I claim, and desire to secure by Letters Patent, is—

1. A car-coupling mechanism, comprising a pair of opposing draw-heads, each including a rotary draw-bar, each draw-bar being axially mounted at one side of the draft-line of the two draw-heads when coupled, each draw-bar having a laterally and rearwardly inclined coupling-hook, the opposing hook members being inclined in reverse directions, the angle of inclination being such, whereby in interengaging, the hook members act to rotate the opposing rotary draw-bars in reverse directions, and means for normally rotating the said bars to the coupling position, as set forth.

2. In a car-coupler of the character described; the draw-head including a forwardly-extended bearing disposed to one side of the line of draft of two opposing draw-heads when coupled, a draw-bar rotatably mounted in said bearing, said bearing and draw-bar having a limited buffer-spring motion and movable together, said draw-bar being axially rotatable by gravity in one direction, and provided with a laterally and rearwardly inclined hook member, adapted to engage and automatically interlock with an opposing member, substantially as shown.

3. A car-coupling, comprising a draw-head, means for mounting said head on the car-timbers for a limited longitudinal buffer movement, said draw-head including a forwardly-projecting tubular bearing, a draw-bar including a shaft rotatably mounted in said bearing, an uncoupling-lever connected to the rear end thereof, a stop device coöperating with the bearing and the shaft for locking the shaft to move longitudinally with the draw-head, said shaft having an integral laterally and rearwardly inclined coupling-hook, whose front face is shaped to engage and ride over an opposing coupling-hook of like structure, as set forth.

4. In a car-coupling as described; a draw-head mounted on the car-body for a limited buffer motion, comprising a draw-bar including a rotary coupling member having a hook projected laterally and inclined rearwardly and whose impacting face is engaged to ride over and interlock with an opposing coupling-hook of like construction, and a horizontally-movable member pivotally mounted on the draw-head in a plane below the rotary coupling member, and adapted to interlock with a knuckle-coupling and means for holding the said grip member locked to an operative or an inoperative position, for the purposes described.

5. In a car-coupling as described; the combination with the draw-head including a horizontally-projected tubular sleeve and a recess at one end transverse to the sleeve; of a rotary shaft mounted within the sleeve, a weighted lever movable in the aforesaid recess and connected to the rear end of the shaft, means for positively interlocking the shaft in the sleeve from longitudinal movement independent of the sleeve, said shaft having an integral laterally and backwardly inclined coupling-hook, substantially as shown and for the purposes described.

6. A car-coupling mechanism of the character described; comprising a pair of opposing draw-heads, each draw-head including a horizontal shaft rotatably mounted and disposed in a plane to one side of the draft-line of the coupling-heads, and a hook member projected laterally and inclined rearwardly, means for normally holding the opposing hooks at crossing angles relatively to each other and with their abutting faces so formed whereby as the two members abut they automatically swing to a position beyond the vertical to pass each other, and means for automatically returning said hooks to their normal or coupling position as they pass each other whereby one of the said hooks will cross the other at the rear thereof and interlock therewith, substantially as shown and for the purposes described.

7. In a car-coupling mechanism as described; the combination with the draw-head including the tubular sleeve, said head having a transverse recess at its rear end terminating in a stop-shoulder for a ball-entrance and a ball-receiving channel communicating with the bore of the sleeve; of the rotary shaft $6^a$ and its hook member 6, said shaft being mounted in the sleeve, an actuating-lever projected through the recess in the rear end of the draw-head and connected to the shaft $6^a$, said shaft having an annular ball-race which opposes the ball-channel in the draw-head, the bearing-balls and a closure for the ball-entrance, all being arranged substantially as shown and for the purposes described.

OTHO C. MOORE.

Witnesses:
G. M. PAYNE,
S. CHAPMAN.